United States Patent
Shakeel et al.

(10) Patent No.: US 9,960,600 B1
(45) Date of Patent: May 1, 2018

(54) DETECTION AND MITIGATION OF INSTABILITY OF SYNCHRONOUS MACHINES

(71) Applicant: General Electric Company, Schenectady, NY (US)

(72) Inventors: Tabrez Shakeel, Houston, TX (US); Muhammed Rahim, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days. days.

(21) Appl. No.: 15/339,597

(22) Filed: Oct. 31, 2016

(51) Int. Cl.
| | |
|---|---|
| *H02K 11/00* | (2016.01) |
| *H02J 3/18* | (2006.01) |
| *H02J 3/16* | (2006.01) |
| *H02J 3/24* | (2006.01) |
| *H02P 9/14* | (2006.01) |

(52) U.S. Cl.
CPC .............. *H02J 3/1864* (2013.01); *H02J 3/16* (2013.01); *H02J 3/24* (2013.01)

(58) Field of Classification Search
USPC ..................................... 322/46, 58; 290/40 B
See application file for complete search history.

(56) References Cited

U.S. PATENT DOCUMENTS

| | | | | |
|---|---|---|---|---|
| 3,987,359 | A * | 10/1976 | Thompson ............ | H02J 3/1864 323/211 |
| 4,418,307 | A | 11/1983 | Hoffmann et al. | |
| 5,227,713 | A * | 7/1993 | Bowler ...................... | G05F 1/20 307/102 |
| 5,310,984 | A * | 5/1994 | Ratledge .............. | B23K 11/252 219/110 |
| 5,900,722 | A * | 5/1999 | Scott ..................... | B23K 9/1062 290/49 |
| 6,118,186 | A * | 9/2000 | Scott ......................... | H02P 9/04 290/1 A |
| 6,489,692 | B1 | 12/2002 | Gilbreth et al. | |
| 7,352,075 | B2 | 4/2008 | Willey et al. | |
| 8,106,540 | B2 | 1/2012 | Larsen et al. | |
| 8,588,984 | B2 | 11/2013 | Rajapaske | |
| 2017/0207716 | A1 * | 7/2017 | Shakeel ................... | H02M 1/42 |

(Continued)

FOREIGN PATENT DOCUMENTS

CN       101872975 A       10/2010

OTHER PUBLICATIONS

Elma Energia Indoor thyristor switched capacitor banks with independent control in each phase for asymmetric loads TN,TN-D [no date].

(Continued)

*Primary Examiner* — Pedro J Cuevas
(74) *Attorney, Agent, or Firm* — Fletcher Yoder, P.C.

(57) ABSTRACT

Methods and systems for stabilizing a power system include receiving a set point for a power system that includes the compensation circuitry controlled by the control system. A firing angle for the power system is set based at least in part on the set point. An angle between a generator terminal of a generator of the power system and a bus of the power system is calculated. A determination is made whether the angle is within a threshold value of the firing angle. When the angle is not within the threshold value of the firing angle, compensation circuitry is engaged to stabilize the power system.

20 Claims, 5 Drawing Sheets

(56) References Cited

U.S. PATENT DOCUMENTS

2017/0279280 A1* 9/2017 Shakeel .................... H02J 3/40

OTHER PUBLICATIONS

German-Sobek et al., "Using of the Thyristor Controlled Series Capacitor in Electric Power System", Elektroenergetika, vol. 4, No. 4, (2011).
Yarlagadda et al., "Automatic Control of Tjurostpr Controlled Series Capacitor (TCSC)", Engineering Research and Applications (IJERA) TSSN: 2248-9622, vol. 2, Issue 3, May-Jun. 2012, pp. 444-449.
Banda et al., "Preparation Modeling of TCSC for Control and Enhancement of Power Flow", 2nd International Conference on Advances in Engineering and Technology (ICAET2012), Mar. 28 & 29, 2012.

\* cited by examiner

DETECTION AND MITIGATION OF INSTABILITY OF SYNCHRONOUS MACHINES

BACKGROUND

The subject matter disclosed herein relates to power grids, and more particularly, to improving synchronization in a synchronous machine.

Synchronous machines include alternating current (AC) rotating machine whose speed in a steady state condition is proportional to the frequency of a current of an armature of the synchronous machine. A magnetic field created by the armature currents rotates at the same speed as that created by the field current on the rotor, which is rotating at the synchronous speed. Synchronous machines may be used as generators especially for large power systems, such as turbine generators and hydroelectric generators in the grid power supply. Power systems including the synchronous machines are designed to compensate and/or adjust in response to various disturbances (e.g., transient angular conditions, etc.). These disturbances may cause instability of the synchronous machine. Stability is the ability to return to a normal or stable operation after having been subjected to some form of disturbance. Instability is a condition denoting loss of synchronism or falling out of step. Although stability issues for the synchronous machine may essentially be a single problem, the stability issues may be divided into different classifications of angular (or synchronous) stability issues or voltage stability. Angular stability refers to the relation between an input power and a load angle. Voltage stability refers to an ability of the power system to maintain steady voltages at all buses in the power system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a compensation system includes compensation circuitry and a control system. The control system includes memory storing instructions and one or more processors configured to execute the instructions. The instructions are configured to cause the one or more processors to receive a set point for a power system that includes the compensation circuitry controlled by the control system, set a firing angle for the power system based at least in part on the set point, calculate an angle between a generator terminal of a generator of the power system and a bus of the power system, determine whether the angle is within a threshold value of the firing angle, and when the angle is not within the threshold value of the firing angle, engage the compensation circuitry.

In a second embodiment, a non-transitory computer-readable medium includes instructions configured to be executed by a processor of a control system where the configured instructions cause the processor to monitor for indications of a transient event in a power system including a generator configured to generate power that is transferred over a line to a load. When indications of transient event are detected, the processor engages compensation circuitry of the power system to stabilize the power system during the transient event. The processor also monitors one or more parameters of the supplied power and determines whether the one or more monitored parameters surpass respective thresholds. When the one or more monitored parameters surpass the respective thresholds indicative of passage of the transient event, the processor disengages the compensation circuitry.

In a third embodiment, a method includes increasing voltage stability of a power system that includes a generator and compensation circuitry includes detect a change in voltage demand by a load of the power system. The method also includes enabling the compensation circuitry to reduce reactive power demand from the generator by engaging the compensation circuitry includes asserting or deasserting a signal at a gate of a thyristor of a thyristor-controlled series compensation circuitry of the compensation circuitry. The method also includes measuring reactive power of the power system, where measuring the reactive power includes calculating $I^2*(X_L-X_C)$ with I being the current through a line of the power system from the generator to the load, $X_L$ being the inductive reactance of the line, and $X_C$ being the capacitive reactance of the compensation circuitry. The method also includes determining, based on the measured reactive power, whether the power system is in a steady state. Moreover, determining whether the power system is in the steady state includes determining whether the reactive power demanded is greater than the reactive power produced by the power system. The method includes disabling the compensation circuitry when the power system is determined to be in the steady state and periodically measuring the reactive power and determining whether in a steady state.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are related to systems and methods to increase stability in synchronous machines using compensation circuitry. Stability may be logically divided into angle stability and voltage stability.

For angle stability, we are often concerned with integrating remote power plants to a large system over long transmission lines. Transient voltage stability is usually closely associated with transient rotor angle stability, and usually, if voltage collapses at a point in a transmission system remote from the load, there is an angle instability problem. If it collapses in a load area, it is likely a voltage instability problem. As discussed herein, the compensation circuitry and it deployment enables increase power transfer from a generator to a load during normal (e.g., steady state) and abnormal (e.g., transient) conditions. The compensation circuitry reduces angular instability in the steady state conditions by reducing a rise of rotor angle spread. The compensation circuitry reduces angular instability in transient events by correcting for conditions where mechanical power exceeds electrical power produced due to a sudden load change.

Voltage stability is concerned with load areas and load characteristics. Basically, voltage stability is load stability, and rotor angle stability is generator stability. In a large interconnected power system, voltage collapse of a load area is possible without the loss of synchronism with the generator. The compensation circuitry effectively reduces reactive power demand and increases generator efficiency when the reactive power demand exceeds produced reactive power.

Figure 1:
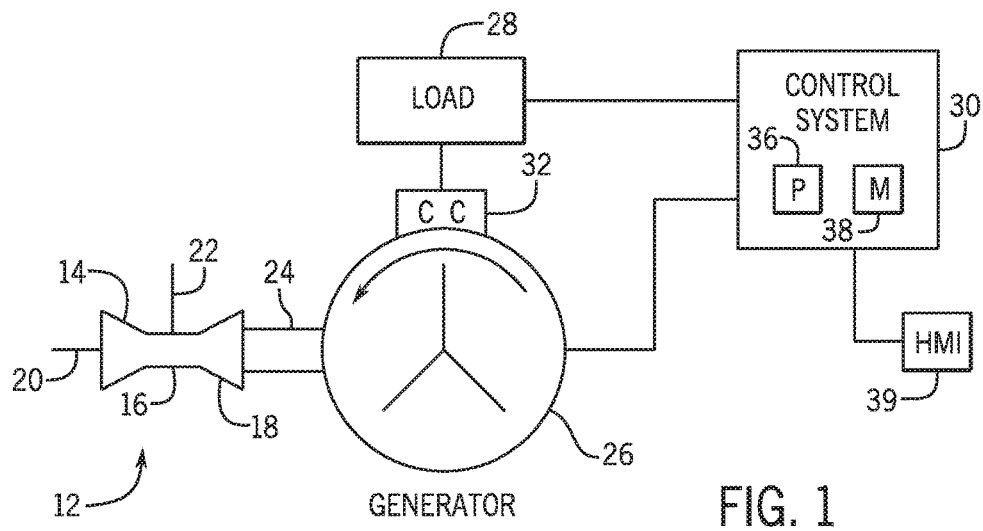
FIG. 1 is a block diagram of an embodiment of a power system having a generator, a load, and compensation circuitry therebetween.

By way of introduction, FIG. 1 is a diagram of a power system 10 that includes turbomachinery 12 having a compressor 14, combustor 16, and turbine 18. The turbomachinery 12 may receive air 20 to be compressed by the compressor 14. The compressed air is mixed with fuel 22 and the air-fuel mixture is combusted in the combustor 16. The combustion mixture of air and fuel may be used to rotate one or more blades of the turbine 18. A rotor of the turbine 18 may be coupled to a shaft 24 to provide rotational energy to a generator 26. While the turbomachinery 12 is described above, any power generation system (e.g., steam or another prime mover) that generates power may be suitable to be used in accordance with embodiments described herein.

The generator 26 converts rotational energy of the shaft 24 into electricity to provide power to a load 28. The load 28 may include any unit that consumes and/or receives power. For example, the load 28 may include a power grid. Additional considerations, such as a number of phases, a rotation of the phases, a voltage window, a frequency window, and a phase angle window may be considered relative to synchronization between the generator 26 and the load 28. Moreover, the number of phases and the rotation of the phases may be selected at the time of equipment choice. A voltage amplitude, phase, and/or frequency of power provided by the generator 26 that corresponds to physical characteristics of the gas turbine 12 (e.g., rotation, torque, etc) may be adjusted to match a voltage amplitude, phase, and/or frequency of the power grid 28 by adjusting the inputs to the gas turbine 12, such as the air 20 and fuel 22. These physical characteristics may be manipulated by a control system 30 that monitors and/or changes the physical characteristics based at least in part on the voltage amplitude, phase, and/or frequency produced by the generator 26 relative to a demand of the load 28, characteristics of the generator 26, and/or characteristics of the load 28. The control system 30 includes one or more processors 36 that execute instructions stored in memory 38. The processors 36 may include central processing units (CPUs) or any suitable processing circuitry for executing code. The memory 38 may include read-only memory (ROM), randomly accessible memory (RAM), flash memory, hard drives, portable memory, and/or any suitable memory for storing instructions that may be executed by the processors 36. The control system 30 may also include a human-machine-interface 39.

On a terminal of the generator 26, there is compensation circuitry 32 that compensates for disturbances to increase angular and first swing stability margins (during transient events) and steady state stability margins (during step load changes) of the generator 26. As discussed below, the compensation circuitry 32 increases these margins with little to no negative effect on a sub-synchronous resonance (SSR). SSR is a condition that may exist in a power system, especially for long-distance transmission systems with series compensated line that may cause shaft fatigue and possible failure of the generator involved. Furthermore, the compensation circuitry 32 increases voltage stability limits of the synchronous machine, decreases the likelihood of "out of step" conditions, and allows the generator 26 to operate at a higher efficiency rate through dynamic power factor correction.

Figure 2:
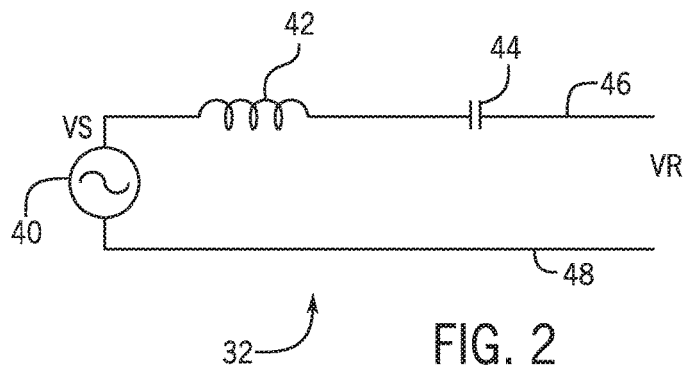
FIG. 2 is a block diagram of an embodiment of the compensation circuitry of FIG. 1 having series compensation circuitry.

FIG. 2 illustrates a schematic diagram of the compensation circuitry 32. The generator 26 generates a source voltage ($V_S$) as a voltage source 40. At least some portion of the connection between the generator 26 and the load 28 includes some line reactance 42 that includes some inductive reactance $X_L$. The compensation circuitry 32 also includes series compensation 44. The compensation circuitry 32 includes some capacitive reactance $X_C$. The series compensation 44 compensates for the variations in series with the line reactance 42. The series compensation 44 may include any suitable compensation for compensating for disturbances to the power system 10. For example, the series compensation 44 may utilize fast-acting (e.g., 0.2 seconds) thyristor-controlled series compensation (TCSC) or any adjustable capacitive reactance compensation. After passage through the line(s) and the compensation circuitry 32, a voltage ($V_R$) exists between a first bus 46 and a second bus 48. Moreover, power is transferred from the generator 26 to the load 28. Real power transferred a net transfer of energy in one direction (from generator 26 to load 28) is known as real power. The real power may be determined from the generator 26 to the load 28 may be determined using the following equation:

$$P = \left[\frac{V_S * V_R}{X_l - X_C}\right] * \sin\delta, \quad \text{(Equation 1)}$$

where P is the real power (in MW) transferred, Vs is the voltage difference at the source, $V_R$ is the voltage difference between the first bus 46 and the second bus 48 at the load 28, $X_L$ is the inductive reactance of the first bus 46, $X_C$ is the capacitive reactance of the series compensation 44, and δ is the angular difference between the voltages of the first bus 46 and the second bus 48.

A portion of the power generated by the generator 26 is not used to do work on the load 28. This portion of power due to stored energy in the line which returns to the generator 26 is known as reactive power. The reactive power may be determined using the following equation:

$$Q = \left[\frac{V_S * (V_S - V_R)}{X_L - X_C} - \frac{V_S^2}{X_S}\right], \quad \text{(Equation 2)}$$

wherein Q is the reactive power transferred (in MW) and $X_S$ is the reactance of the generator 32.

Surge impedance loading (SIL) of the transmission line is the loading (MW) of the line at which natural power balance occurs. In other words, the SIL is the point where reactive power used is greater than or less than reactive power produced. The SIL balance may be determined using the following equation:

$$\frac{V_S^2}{X_S} \geq I^2(X_L - X_C), \quad \text{(Equation 3)}$$

where I corresponds the current passing through the line.

Figure 3:
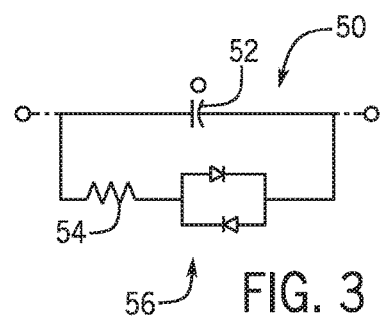
FIG. 3 is a block diagram of an embodiment of the series compensation circuitry of FIG. 2.

FIG. 3 illustrates an embodiment of the series compensation 44 as TCSC circuitry 50 that may be used in the series compensation 44 of FIG. 2. The TSCS circuitry 50 includes a series compensating capacitor 52 shunted by a reactor ($L_S$) 54. The TSCS circuitry 52 also includes a phase-controlled anti-parallel thyristor 56. The reactance of the TCSC circuitry 50 may be determined using the following equation:

$$X_{TCSC}(\alpha) = \frac{X_C * X_{TCR}(\alpha)}{X_{TCR}(\alpha) - X_C}, \quad \text{(Equation 4)}$$

where $X_{TCSC}(\alpha)$ is the reactance of the TCSC circuitry 50 relative to a delay angle (α) and $X_{TCR}(\alpha)$ is the reactance of the thyristor controlled reactor 54 relative to the delay angle, where the delay angle is measured from a peak of the capacitor 52 voltage (or the zero crossing of the line current, I).

Figure 4:
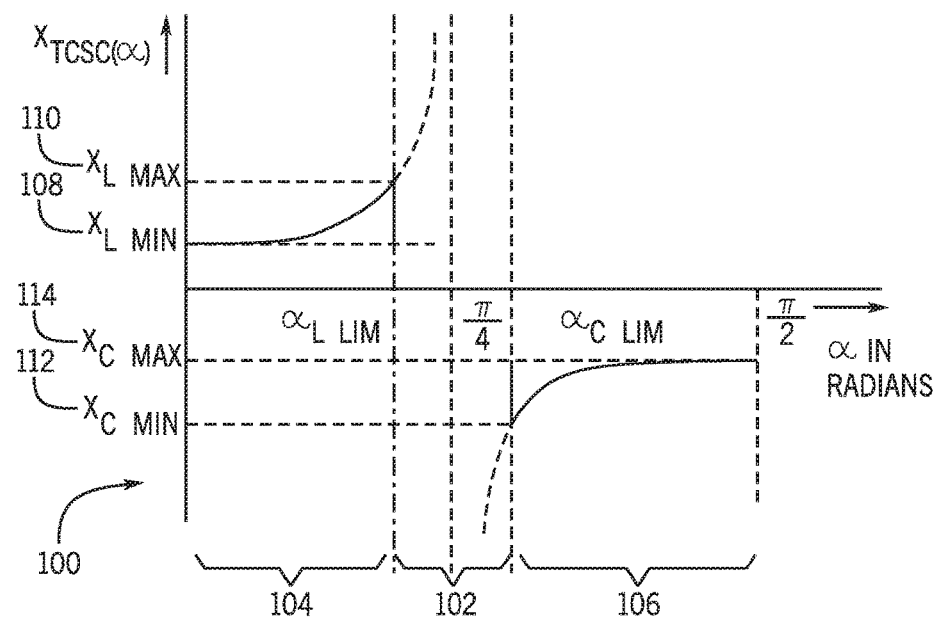
FIG. 4 is a graphical view of an embodiment of operation zone of the series compensation circuitry of FIG. 3.

FIG. 4 illustrates a graph 100 of operating curves of the TCSC circuitry 50 representing reactance of the TCSC circuitry 50 relative to the delay angle (α) in radians and $X_L > X_C$. The TCSC circuitry 50 is inhibited from operating in an inhibit region 102 that includes delay angle values between those where $\alpha = \alpha_{L\ lim}$ and $\alpha = \alpha_{C\ lim}$. In some embodiments, the $\alpha_{L\ lim}$ and the $\alpha_{C\ lim}$ may be selected to be respective values that is determined relative to maximum reactance of the inductor 54 and the capacitor 44, respectively. This inhibit region 102 corresponds to a region where $X_{TCR}(\alpha) \approx X_C$ about which point the TCSC circuitry 50 resonates (e.g., α=π/4). When the delay angle is less than π/4 radians and outside the inhibit region 102, the TCSC circuitry 50 operates in an inductive region 104. When the delay angle is greater than π/4 and outside the inhibit region 102, the TCSC circuitry 50 operates in a capacitive region 104. In the inductive region 106, the TCSC circuitry 50 operates with a reactance at an $X_{L\ min}$ 108 value when the no delay angle is zero and increases until achieving a reactance at an $X_L$ max 110 value corresponding to a delay angle of $\alpha_{C\ lim}$. In the capacitive region 106, the TCSC circuitry 50 operates with a reactance at an $X_{C\ min}$ 112 value when the delay angle is $\alpha_{C\ lim}$ and increases until achieving a reactance at an $X_C$ max 114 value corresponding to a delay angle of π/2.

I. Angular Stability

Angular stability via the compensation circuitry 32 enables increased power transfer capability from the generator 26 to the load 28 during normal and abnormal operating conditions. Also, angular stability reduces a risk of "pole slipping." Pole slipping typically occurs under fault conditions which cause a transient torque to be exerted on the generator 26. The torque exceeds the ability of the field to hold the generator rotor synchronized to the generator stator. A generator is most susceptible to this problem when it has a low excitation, as this produces a weak magnetic field. Pole slipping is more likely in the event of a system fault. The 'slip' occurs when the rotor experiences a physical and electrical shift in position relative to the stator, after which the field recovers enough strength to lock the rotor back in synch with the stator. When this slip occurs, the violent acceleration and deceleration associated with pole slip may cause enormous stress on the generator 26 and turbine 16. The control system 30 may act to attempt to block operation at or outside of a stability limit, but certain abrupt changes in the power system 10 caused by faults or certain switching operations may exceed the ability of the control system 30 to respond without utilizing the compensation circuitry 32.

Angular stability via the compensation circuitry 32 also reduces likelihood of steady-state instability during load increases by reducing a rise in rotor angle spread. During transient events (e.g., system faults), angular stability via the compensation circuitry 32 improves the ability of the power system 10 to remain synchronized with the load 28.

a. Steady State Angular Stability Correction

Figure 5:
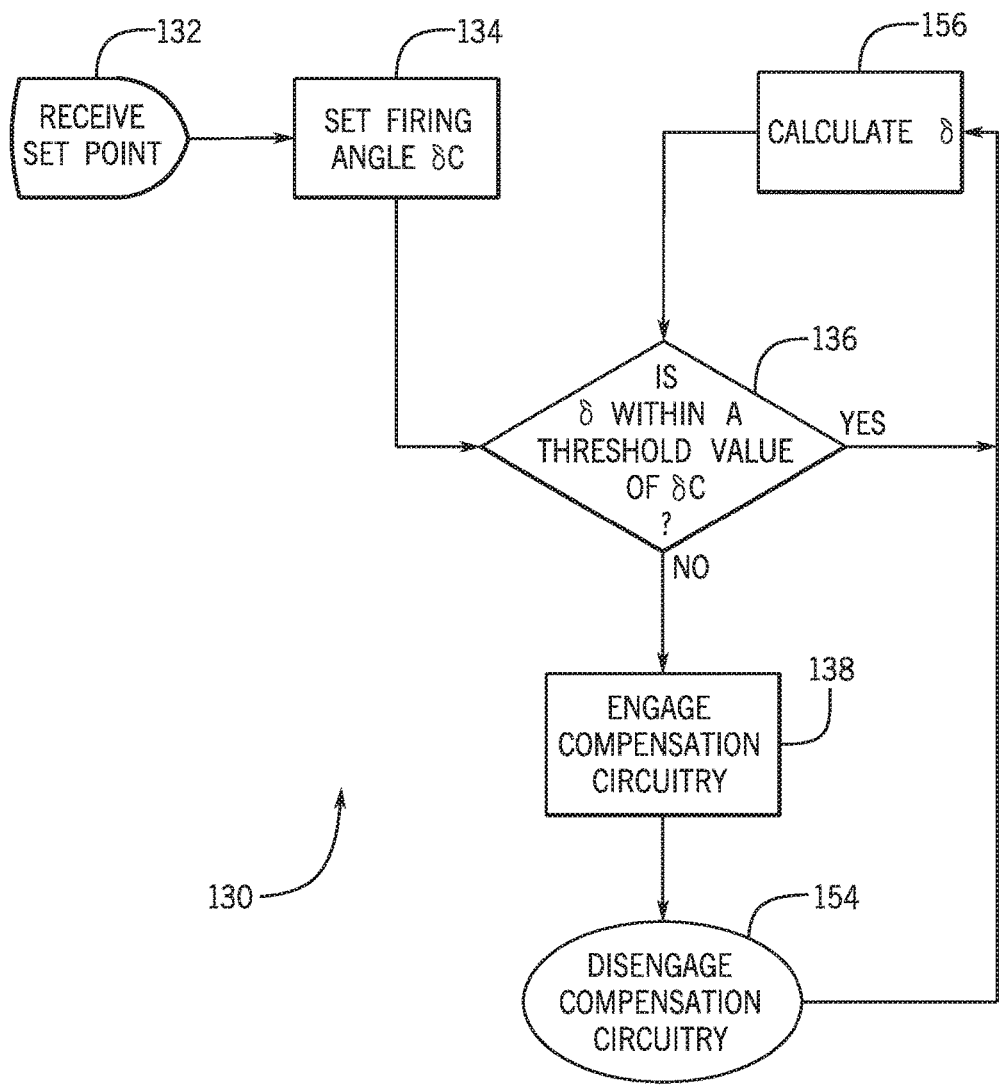
FIG. 5 is a flow diagram of a process that may be performed to enhance angular stability of the power system of FIG. 1 using the compensation circuitry during steady state operation of the power system.

FIG. 5 illustrates a process 130 for operating the compensation circuitry 32. The process 130 may be performed by the processors 36 of the control system 30. The process 130 begins by the processors 36 receiving a set point from a user via the HMI 39 of the control system 30 (block 132). The processors 134 then set a firing angle $\delta_C$ (block 134). The processors 36 then determine whether an angle (δ) between the generator terminal (Vs) and the bus ($V_R$) is within a threshold of the a firing angle $\delta_C$ (block 136). The angle δ may be determined, in radians, using the power transfer equation below:

$$\delta = \sin^{-1}\left(\frac{P * X_L}{V_R * V_S}\right), \quad \text{(Equation 5)}$$

where each element of Equation 5 is the same element from Equation 1. The voltages ($V_R$ and $V_S$, respectively) at the load 28 and at the generator 26 may be measured. The line reactance $X_L$ may have been previously determined. For example, Equation 1 may be used and manipulated to solve for $X_L$ while other factors are known. Furthermore, the power transferred may be measured as $P_E$ electrical power doing work on the load 28. The threshold may be a relative amount (e.g., 5%) of change from the angle δ to the firing angle $δ_C$.

Figure 6:
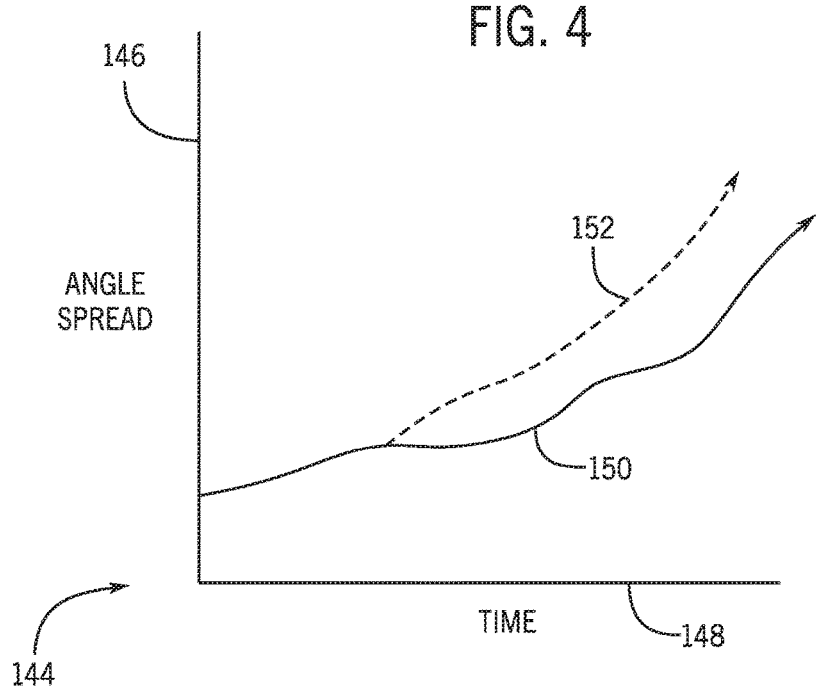
FIG. 6 is a graphical view of an embodiment of an effect of the process of FIG. 5 on angle spread over time.

If the angle δ is not within the threshold, the processors 36 engage the compensation circuitry 32 (block 138). In some embodiments, the compensation circuitry 32 may be engaged or disengaged using the thyristors 56. These thyristors 56 (or other control mechanisms, such as transistors) may be controlled using signals generated by the control system 30. By engaging the compensation circuitry 32 threshold may cause an increase in torque on the rotor of the generator 26 to be dampened. In other words, the steady state stability is improved by engaging the capacitor reactance ($X_C$) when power output increases by dampening the angle spread. For example, FIG. 6 illustrates a graph 144 of angle spread of the generator 26 over time 148. As illustrated, the angle spread, illustrated by line 150, using deployed compensation circuitry 32 when the angle δ is not within a threshold of the firing angle $δ_C$ less of a rise in angle spread than when the compensation circuitry 32 is not selectively applied as illustrated by line 152.

Returning to FIG. 5, after some period of time with the compensation circuitry 32 engaged, the processors 36 disengage the compensation circuitry 32 (block 154). For example, the processors 36 may determine that the angle δ has come within the threshold of the firing angle $δ_C$ and may disengage the compensation circuitry 32 accordingly. Additionally or alternatively, an operator of the control system 30 may disengage the compensation circuitry 32 using the HMI 39 of the control system 30. The processors 36 continue monitoring the angle δ to determine if the angle δ has moved outside the threshold from the firing angle $δ_C$ by continuing to calculate the angle δ (block 156).

b. Transient State Angular Stability Correction

As previously discussed, the compensation circuitry 32 may be used to compensate for transient state (first swing) instability. Specifically, the transient stability of the generator 26 is improved by deploying the capacitive reactance ($X_C$) when mechanical power ($P_M$) generated by the power system 10 exceeds electrical power $P_E$ received at the load 28 due to a sudden load change. As discussed below, the load change is detected by a rapid change in current, I, while $P_E$ drops below $P_M$. A change in speed of the shaft 24 may be used as an additional factor into identifying transient instability. Once these factors have been identified, the capacitive reactance ($X_C$) may be deployed until the transient has passed (i.e., current and/or voltage has returned to normal operating conditions).

Figure 7:
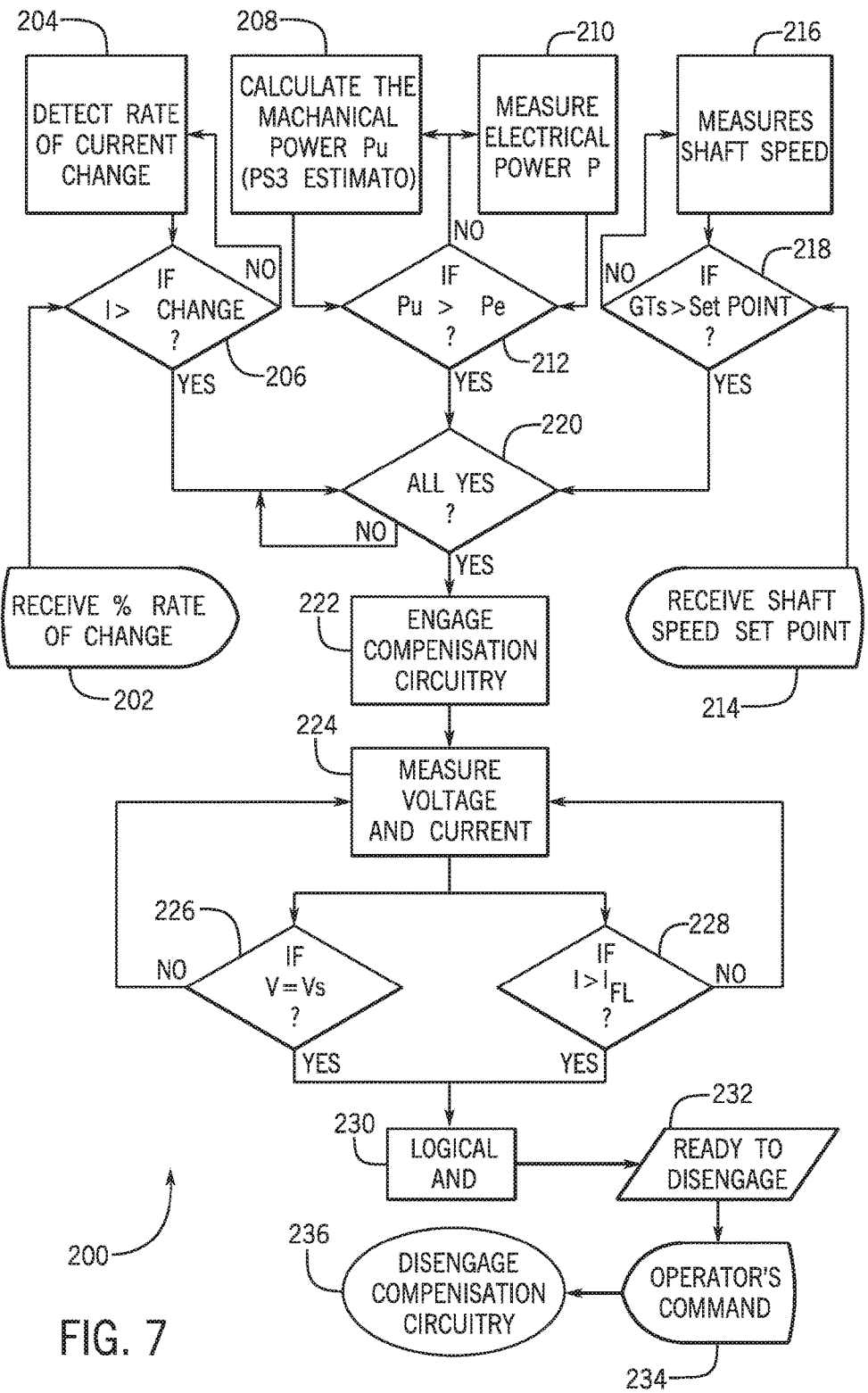
FIG. 7 is a flow diagram of a process that may be performed to enhance angular stability of the power system of FIG. 1 using the compensation circuitry during transient state operation of the power system.

FIG. 7 illustrates a process 200 that may be executed by the processors 36 to deal with transient states. In some embodiments, the processors 36 receives a percentage rate of change in generated current (block 202). This percentage change may be received from the HMI 39, the memory 38, and/or any other location from which the percentage rate of change may be retrieved. The processors 36 detect a rate of current change (block 204). The processors 36 may detect the rate of current change using one or more sensors in the power system 10. The processors 36 determine if the detected current exceeds the percentage rate of change (block 206).

The processors 36 calculate a mechanical power $P_M$ (block 208). This calculation may be determined using various parameters of the turbine 16. The processors 36 also calculate an power $P_E$ at the load 28 (block 210). The processors 36 compare the $P_E$ and $P_M$ to determine whether the $P_M$ is greater than the $P_E$ (block 212).

In some embodiments, the processors 36 receive a set point relative for shaft speed of the shaft (block 214). The processors 36 also measure shaft speed of the shaft 24 (block 216). The processors 36 then determine whether the shaft speed of the shaft 24 exceeds the set point (block 218).

Once the processors 36 have determined (block 220) that the current exceeds the current rate of change, that the $P_M$ has exceeded the $P_E$, and/or shaft speed of the shaft 24 exceeds a set point. If one, two, or three of the factors are determined to exist, the processors 36 engage the compensation circuitry 32 (block 222). The processors 36 monitor parameters of the supplied power (block 224). For example, the processors 36 may monitor power and voltage of the power system 10. The processors 36 may utilize this information to determine when the transient state has passed. For example, the processors 36 may determine whether the voltage equals the Vs (block 226) and/or whether the current is less than or equal to full load current supplied by the generator $I_{FL}$ (block 228). If both conditions are satisfied, the processors 36 may determine that the transient has passed and the compensation circuitry 32 is ready to disengage (block 230). Additionally or alternatively, the processors 36 may determine that the compensation circuitry 32 is ready to disengage after only one condition is met and/or alternative conditions related to passage of the transient state. In some embodiments, the processors 36 may send an indicator via the HMI 39 to display that the compensation circuitry 32 is ready to disengage. This notification may include audible and/or visible notifications. The processors 36 may also disengage the compensation circuitry 32 once the processors 36 have determined that the transient state has passed. Additionally or alternatively, the processors 36 may wait to receive a command (block 234) prior to disengaging the compensation circuitry 32 (block 236).

II. Voltage Stability

Voltage stability is the ability of power system 10 to maintain steady voltages at all buses in the power system 10 after being subjected to a disturbance from a given initial operating condition. Voltage stability via the compensation circuitry 32 may address some disturbance (e.g., small disturbances) voltage stability that result from perturbations, such as incremental changes in the load 28. The compensation circuitry 32 increases a power transferred relative to reactive power produced and/or absorbed. Similarly, the compensation circuitry 32 also increases bus voltages relative to reactive power produced and/or absorbed. These increases increase the change of the voltage to remain in a stable region by effectively reducing the reactive power demand and increasing generator efficiency. In other words, voltage state instability is corrected by engaging compensation circuitry 32 (e.g., TCSC circuitry 50) to achieve a steady state condition after a shift in voltage demand. The steady state operation is represented by the following equation, where demand is less than or equal to the reactive power produced:

$$\frac{V_S^2}{X_S} \geq I^2 * X_L, \quad \text{(Equation 6)}$$

where $$\frac{V_S^2}{X_S}$$

is the reactive power produced and $I^2*X_L$ is the reactive power demand. The compensation circuitry 32 may be engaged for an entire duration where the demand exceeds a produced reactive power.

Figure 8:
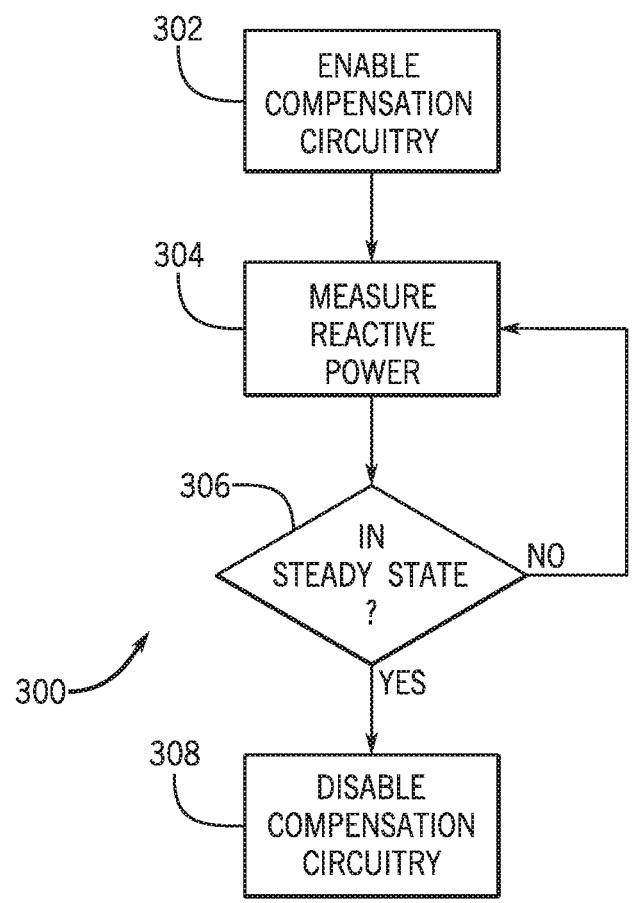
FIG. 8 is a flow diagram of a process that may be performed to enhance voltage stability of the power system of FIG. 1 using the compensation circuitry during operation of the power system.

FIG. 8 is a process 300 that may be at least partially executed by the processors 36 to increase voltage stability in the power system 10. In some embodiments, the process 300 may only be applied to small disturbances below a threshold. Moreover, in some embodiments, the process 300 may only performed when the demand exceeds the produced reactive power.

The process 300 may include receiving an indication of some change in voltage demand. This change in demand may be monitored by the processors 36 using one or more sensors. In response to the indication or independent of the indication, the processors 36 may enable the compensation circuitry 32 to effectively reduce the reactive power demand and increasing generator efficiency (block 302). The processors 36 measure reactive power generated after engaging compensation circuitry 32 (block 304). For example, the processors 36 may measure $I^2*(X_L-X_C)$ as the reactive power and compare the result with the steady state condition. The processors 36 may also determine whether the power system 10 is in a steady state (block 306). In other words, the processors 36 may determine whether the condition detailed in Equation 6 is satisfied. Specifically, blocks 304 and 306 are a loop deployed by the control system by measuring the reactive voltage after engaging compensation circuitry and comparing it with steady state value (without $X_C$). Once the extra demand is removed, the steady state condition will become true, and the controls system will be ready to disengage the compensation circuitry 32. If steady state is not achieved, the processors 36 continue to monitor reactive power and determining if the power system 10 is in a steady state. If so, the processors 36 disable, indicate that disabling of, and/or enables disabling of the compensation circuitry 32 (block 308).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A compensation system, comprising:
   compensation circuitry; and
   a control system comprising:
   memory storing instructions; and
   one or more processors configured to execute the instructions that are configured to cause the one or more processors to:
   receive a set point for a power system that includes the compensation circuitry controlled by the control system;
   set a firing angle for the power system based at least in part on the set point;
   calculate an angle between a generator terminal of a generator of the power system and a bus of the power system;
   determine whether the angle is within a threshold value of the firing angle; and
   when the angle is not within the threshold value of the firing angle, engage the compensation circuitry.

2. The compensation system of claim 1, wherein the compensation circuitry comprises circuitry that is in series with a line transmitting power from the generator to a load of the power system.

3. The compensation system of claim 2, wherein the compensation circuitry comprises an adjustable capacitive reactance circuit.

4. The compensation system of claim 3, wherein the compensation circuitry comprises thyristor-controlled series compensation circuitry.

5. The compensation system of claim 4, wherein engaging the compensation circuitry comprises asserting or deasserting a signal to a gate of one or more thryristors of the compensation circuitry.

6. The compensation system of claim 1, wherein the control system comprises a human-to-machine interface configured to receive the set point.

7. The compensation system of claim 1, wherein calculating the angle comprises using the following equation:

$$\delta = \sin^{-1}\left(\frac{P*X_L}{V_R*V_S}\right),$$

where P is real power transferred from the generator to a load of the power system, $X_L$ is an inductive reactance of a line between the generator and load used to transfer the real power, $V_R$ is a voltage difference at the load, and $V_S$ is the voltage difference at the generator.

8. The compensation system of claim 1, wherein the threshold value is a relative threshold indicating a relative relationship between the firing angle and the angle.

9. The compensation system of claim 8, wherein threshold value comprises a value of 5 percent.

10. The compensation system of claim 1, wherein the instructions are configured to cause the one or more processors to disengage the compensation circuitry while continuing to periodically calculate the angle and determine whether a periodically calculated angle is within a threshold value of the firing angle.

11. The compensation system of claim 10, wherein the instructions are configured to cause the one or more processors to re-engage the compensation circuitry after disengaging the compensation circuitry when the periodically calculated angle is not within a threshold value of the firing angle.

12. The compensation system of claim 10, wherein the control system comprises a human-to-machine interface, and the instructions are configured to cause the one or more processors to disengage the compensation circuitry in response to a disengage command received via the human-to-machine interface.

13. The compensation system of claim 10, wherein the instructions are configured to cause the one or more processors to, during engagement of the compensation circuitry:
   periodically calculate a periodic angle between the generator terminal of the generator and the bus of the power system; and
   determine whether the periodic angle is within the threshold value of the firing angle, wherein the one or more processors cause disengagement of the compensation circuitry when the periodic angle is within the threshold value.

14. A non-transitory computer-readable medium comprising instructions configured to be executed by one or more processors of a control system, wherein the instructions comprise instructions configured to cause the one or more processors to:
monitor for indications of a transient event in a power system including a generator configured to generate power that is transferred over a line to a load;
when indications of transient event are detected, engage compensation circuitry of power system to stabilize the power system during the transient event;
monitor one or more parameters of the supplied power;
determine whether the one or more monitored parameters surpass respective thresholds; and
when the one or more monitored parameters surpass the respective thresholds indicative of passage of the transient event, disengage the compensation circuitry.

15. The non-transitory computer readable medium of claim 14, wherein engaging the compensation circuitry comprises asserting or deasserting a signal at a gate of a thyristor of a thyristor-controlled series compensation circuitry of the compensation circuitry.

16. The non-transitory computer readable medium of claim 14, wherein the indications comprise a current of the generator exceeds a threshold rate of change, mechanical power of the power system is greater than electrical power transferred, or shaft speed of a shaft of the power system exceeds a shaft speed threshold.

17. The non-transitory computer readable medium of claim 14, wherein the instructions are configured to cause the one or more processors to deem the indications as detected when the indications includes the current of the generator exceeding the threshold rate of change, the mechanical power of the power system is greater than the electrical power transferred, and the shaft speed of the shaft exceeds the shaft speed threshold.

18. The non-transitory computer readable medium of claim 14, wherein the one or more parameters of supplied power comprises a voltage level of the supplied power and the respective threshold for the voltage level is a source voltage from the generator.

19. The non-transitory computer readable medium of claim 11, wherein the one or more parameters of supplied power comprises a current level of the supplied power and the respective threshold for the current level is when the current level is less than or equal to a target current.

20. A method for increasing voltage stability of a power system that includes a generator and compensation circuitry, comprising:
detect a change in voltage demand by a load of the power system;
enabling the compensation circuitry to reduce reactive power demand from the generator by engaging the compensation circuitry comprises asserting or deasserting a signal at a gate of a thyristor of a thyristor-controlled series compensation circuitry of the compensation circuitry;
measuring reactive power of the power system, wherein measuring the reactive power comprises by calculating $I^2*(X_L-X_C)$, wherein I is the current through a line of the power system from the generator to the load, $X_L$ is the inductive reactance of the line, and $X_C$ is the capacitive reactance of the compensation circuitry;
based on the measured reactive power, determining whether the power system is in a steady state, wherein determining whether the power system is in the steady state comprises determining whether the reactive power demanded is greater than the reactive power produced by the power system;
when the power system is determined to be in the steady state, disabling the compensation circuitry; and
when the power system is determined to not be in the steady state, periodically measuring the reactive power and determining whether in a steady state.

* * * * *